July 28, 1925.
W. F. MEYER
CULTIVATOR ATTACHMENT
Filed July 5, 1924
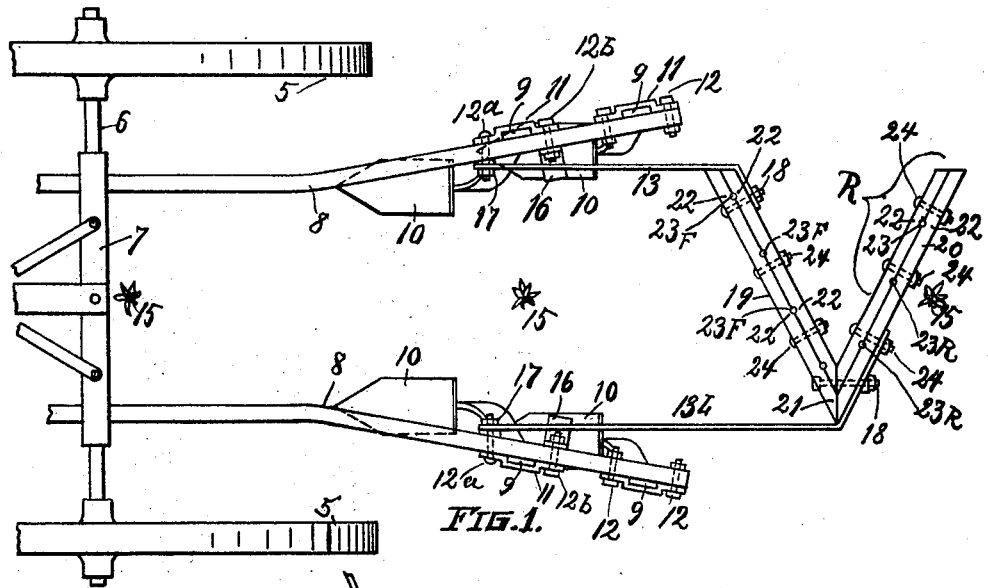
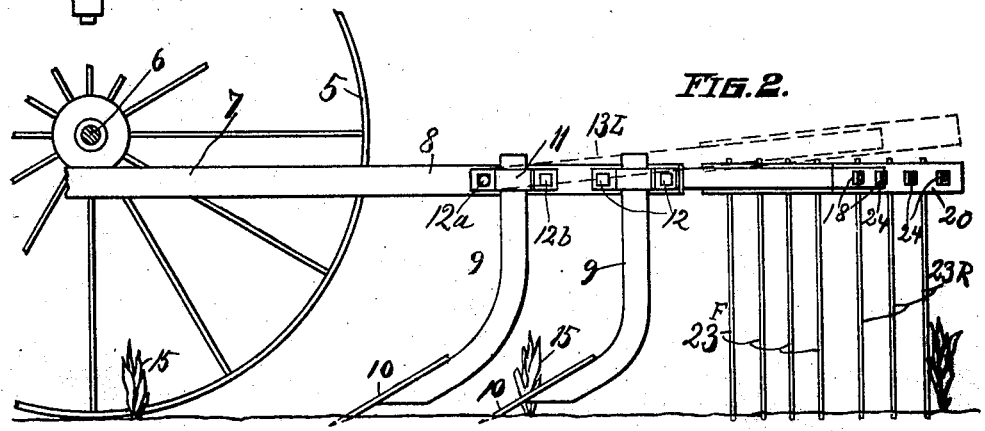
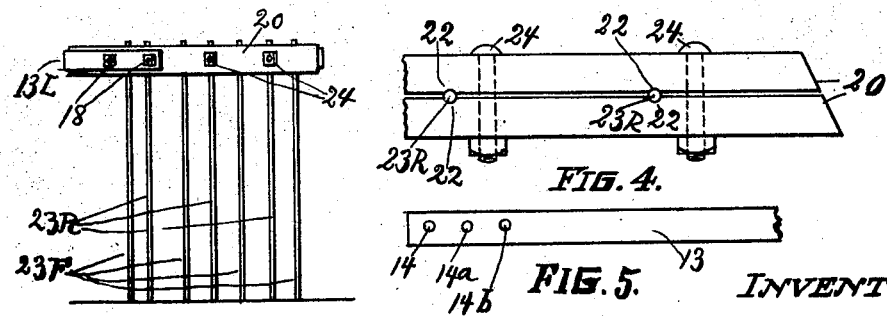
INVENTOR:
William F. Meyer
BY A. M. Carlsen
ATTORNEY.

Patented July 28, 1925.

1,547,433

UNITED STATES PATENT OFFICE.

WILLIAM F. MEYER, OF NEW RICHMOND, WISCONSIN.

CULTIVATOR ATTACHMENT.

Application filed July 5, 1924. Serial No. 724,191.

*To all whom it may concern:*

Be it known that I, WILLIAM F. MEYER, a citizen of the United States, residing at New Richmond, in the county of St. Croix and State of Wisconsin, have invented certain new and useful Improvements in Cultivator Attachments, of which the following is a specification.

My invention relates to cultivator attachments, and the object is to provide a cultivator with means for removing the weeds usually left standing between the plants when an ordinary cultivator operates only on the plain surfaces near each side of a row of plants. A further object is to make said means attachable to regular cultivator and adjustable both longitudinally, laterally and vertically.

In the accompanying drawing:

Fig. 1 is a top or plan view of a cultivator provided with my attachment.

Fig. 2 is a side elevation of Fig. 1.

Fig. 3 is a rear elevation of the attachment.

Fig. 4 is an enlargement of the portion R of Fig. 1 showing more clearly the construction of the attachment.

Fig. 5 is a side view of either one of the arms 13—13$^L$ in Fig. 1.

Referring to the drawing by reference numerals, 5 designates the ground wheels, 6 the axle and 7 the rear portion of the frame of a cultivator having two diverging rear bars 8 to which the vertical shanks 9 of cultivator teeth 10 are secured by clamps 11 and bolts 12, 12$^a$ and 12$^b$.

My attachment is provided with two parallel flat bars 13, 13$^L$, each having at its front end a row of holes 14, 14$^a$, 14$^b$ (see Fig. 5) either one of which holes may be pivotally occupied by a bolt 12$^a$ retained by nut 17 or other means so as to adjust the attachment forwardly and rearwardly, and also if so required, hold it toward either side of a central row of plants 15.

Each bar 13 and 13$^L$ is normally supported on an L-shaped bracket 16 secured on the bolts 12$^b$. Said bars are different lengths and have their rear ends bolted at 18 to the frame of the attachment. Said frame is of V-shape making a front arm 19 and a rear arm 20 united at 21. Each arm is divided longitudinally into two members having meeting vertical grooves 22 forming holes in which vertically arranged heavy wire teeth 23 are clamped when the members are pulled toward each other by bolts 18 and 24, a slight clearance being left between the members.

The rear teeth 23$^R$ are so arranged as to move in lines parallel to and between the lines of motion of the front teeth 23$^F$.

In the operation of the cultivator and my attachment the teeth 23 may be adjusted vertically in the V-shaped frame by loosening some of the bolts 24 and tightening them again after adjusting the teeth to the desired depth in the soil relative to the cultivator teeth. And as already stated the attachment may be adjusted back and forth bodily or one side of it by placing the desired hole 14, 14$^a$ and 14$^b$ on the adjacent bolt 12$^a$.

As the cultivator is drawn forward the teeth 23$^F$ and 23$^R$ move close to and often between the stands of corn or other plants and clears away the weeds left by the cultivator teeth 10 which are too stiff and cutting to come in contact with the stands and are therefore spaced beyond them.

If a tooth of the attachment should hit a rock or other obstruction it is resilient enough to pass over it or sidewise past it, but stiff enough to uproot chickenweed and other weeds of various kinds so apt to grow between the stands or hills. At the time of cultivating of the planted crops the stands are usually large and strong enough to suffer no damage from the teeth of the attachment, if it happens that any of them come in contact therewith.

What I claim is:

In a cultivator, the combination of a front frame comprising spaced beams provided with cutivator teeth, and a rear frame of V-shaped form, inwardly spaced from said beams, a rod connected to each end of one side of said V-frame, said rods being connected to said beams, and resilient wire teeth extending downward from the V-frame.

In testimony whereof I affix my signature.

WILLIAM F. MEYER.